INVENTOR.
Helmut Langenberger

Aug. 4, 1964     H. LANGENBERGER     3,143,289
CALCULATING MACHINE FOR DIVISION CALCULATIONS
Filed Nov. 22, 1961     7 Sheets-Sheet 3

INVENTOR.
Helmuth Langenberger

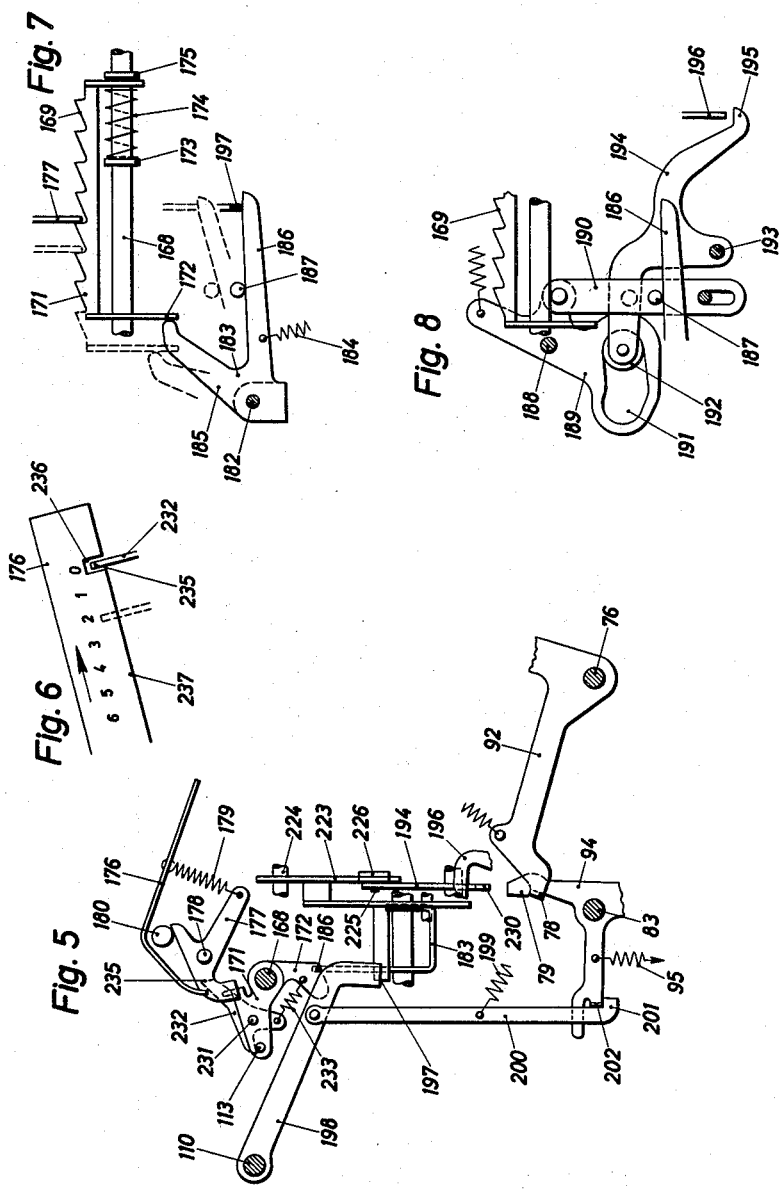

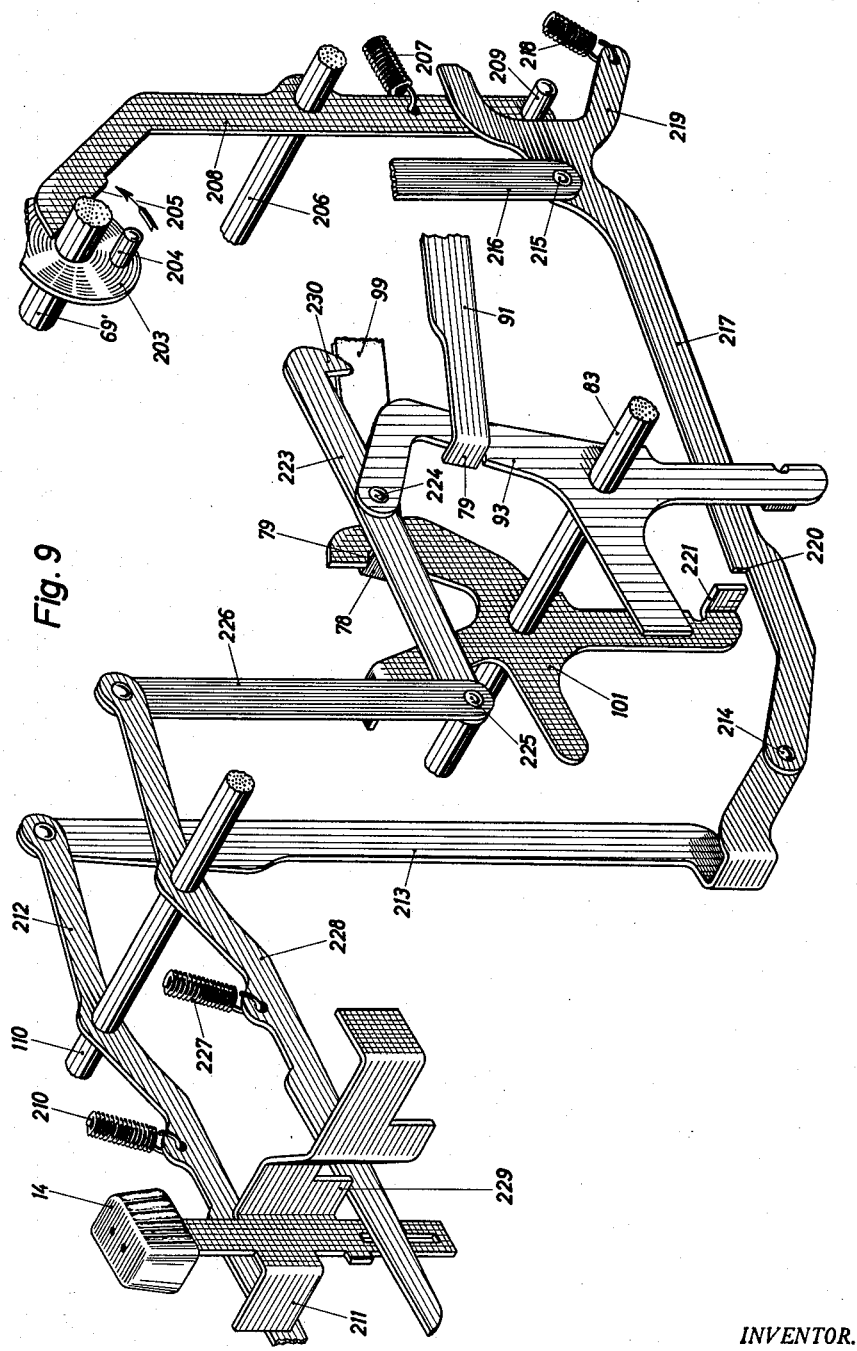

United States Patent Office 3,143,289
Patented Aug. 4, 1964

3,143,289
CALCULATING MACHINE FOR DIVISION
CALCULATIONS
Helmut Langenberger, Niederstotzingen, Wurttemberg,
Germany, assignor to Walter Buromaschinen Gesellschaft m.b.H., Essen, Germany, a firm
Filed Nov. 22, 1961, Ser. No. 154,236
12 Claims. (Cl. 235—60.15)

The invention relates to devices for performing division in calculating machines for applying the first four rules of arithmetic, and its purpose is to effect the printing and setting of the decimal point in dividend, divisor and quotient in a quick and simple manner, in that, in a known manner, the maximum number of places or digits to the right of the decimal point, which the quotient should contain, is preset and, correspondingly, the same number of places to the right of the decimal point is preset for the dividend and divisor. If, in the case of one of the values cited, the number of places to the right of the decimal point is less than the preset number, then the missing digits are to be replaced by zeros.

In this way, it is possible to successfully obtain the correct position of the decimal point without difficulty, entirely automatically, reliably and without special deliberation or additional settings of the calculating machine, the operations necessary for effectively presetting of the decimal point position conforming automatically with the usual steps in the calculation of a division.

This problem is solved by a device according to the invention in which a decimal point setting element is provided for which in calculations of division predetermines a corresponding decimal point position in the printing mechanism for printing the qoutient and simultaneously automatically causes a rounding off or cutting short of the quotient to a predetermined number of places to the right of the decimal point by controlling a corresponding shifting of the totalizer to the right from its home position before the transfer of the dividend into the totalizer by a number of denominations or places which corresponds to the number of places to the right of the decimal point of the quotient. For this purpose, the decimal point setting element may consist of a movable, stepped setting plate, against the set step of which the lug of a step control bar after the initiation of the stepwise shifting rearwardly of the totalizer at each shift step of the totalizer to the right and as a result of the striking of the control bar against the set step disconnects the drive of the totalizer shift.

The invention is a supplement to the value cut-short device for multiplication machines described in the U.S. Patent application Ser. No. 809,141, now U.S. Patent No. 3,076,597 in which similarly a preselectable number of denominations or places to the right of the decimal point for the factors and the product of a multiplication is set and by means of a decimal point setting element in the form of a setting plate which is essentially similar to that already mentioned above.

The device according to the present invention is constructed in such manner that it can be incorporated directly in the heretofore proposed kinds of machines, so that the correct printing of the decimal point is obtained not only for the factors and product of a multiplication but also for the dividend, divisor and quotient of a division by actuating one and the same decimal point setting element, followed by the usual actuation of the appropriate function keys, and introduction of the factors and the dividend and divisor.

In the heretofore proposed construction cited, an actuating bar co-acting with the stepped decimal point setting plate is also used. This, however, is not identical with the step control bar moved stepwise along the setting plate in the present application. The bar used in the U.S. Patent application Serial No. 809,141 is, on the contrary moved back stepwise from the setting plate into its starting position by which means the appropriate shift steps of the totalizer are controlled. In the combination of the object of the invention with the object of U.S. Patent application 809,141, thus two control bars are necessary, coacting with a single setting plate to shift the totalizer, one for multiplication and the other for division.

The invention shows, moreover, that immediately following the striking of the control bar on the set step of the setting plate, an additional shift step to the right automatically follows which arrests the rightward motion of the totalizer, initiated by the dividend key and the initiation of a shift step to the left cancelling the additive or additional shift step to the right and initiating the introduction of the dividend of the totalizer.

As a result of the uniformity of the decimal point position for dividend, divisor and quotient, explained above, the device for printing the decimal point, particularly the device for controlling the printing drive in the relevant decimal point position can be made very simple in form. It consists in that the decimal point printing device is controlled directly by the setting motion of the decimal point setting plate and the decimal point printing element associated with the setting of the setting plate is made effective.

Further features and advantages of the invention are disclosed by the following description of an exemplary form of embodiment of the invention.

In the corresponding drawing:

FIGS. 5 to 8 are side views of the control elements for transferring the dividend to the totalizer.

FIG. 9 is a perspective view of the gearing elements connecting the dividend key with clutch or coupling and driving devices.

*General Construction of the Calculating Machine*

Figure 1:
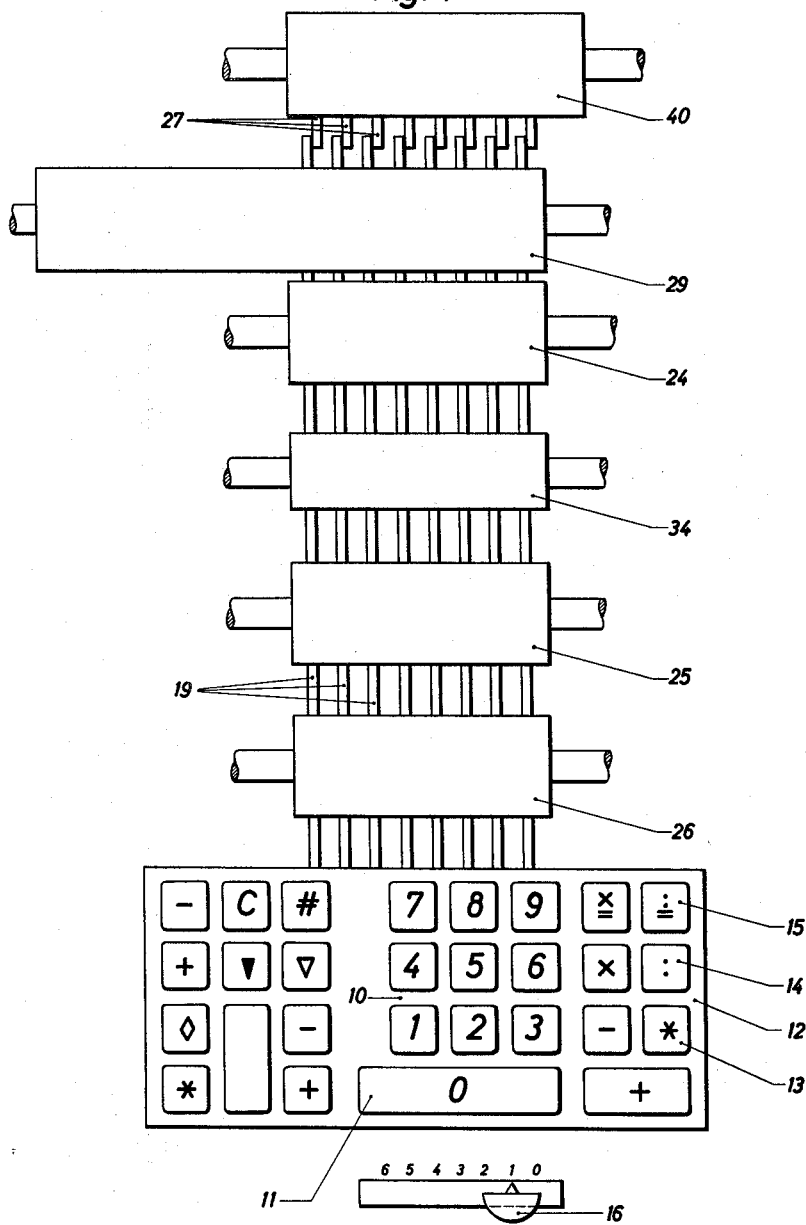
FIG. 1 is a diagrammatic representation of the principal mechanism of a calculating machine constructed according to the invention.

The calculating machine on which the following exemplary form of embodiment of the invention is based has a setting mechanism with a ten key keyboard 10 (FIG. 1) which consists of the digit keys 1–9, a zero key bar 11 and the function keys 12 among the latter of which, in the present case, we are only concerned with the adding key 13, the dividend key 14, and the divisor key 15. Below the keyboard, through a slot in the casing, a decimal point setting knob 16 projects, which is used to set the decimal point position in one of the settings numbered from 0–6, each digit whereof indicates the number of places which should be present to the right of the decimal point in the different amounts in the division.

With the set of ten keys 10, there coacts in known manner, a set pin carriage 17 (FIG. 2) which is movably guided along fixed bars 18 and serves to set the actuating rack-bars 19 to the values of the amounts keyed by the keys 10. The actuator bars 19 are longitudinally movable in the machine and in their starting position, with their lower ends under the action of tension springs 20, they lie against a transversely-placed restoring bar 21, movable longitudinally along the machine. When the latter has completed its stroke in the direction of the arrow 22 to reach position 21', then the actuator bars 19 follow under the action of their springs 20 until they are held in place by the setting pins 23 of the set-pin carriage 17 or by other stop elements positioned by means of the digit keys 1 to 9. Before the return of the restoring bar 21 from the position 21' to the home position 21, those receiving devices, in particular, totalizers, in which the amount set in the actuator bars 19 is to be transferred during the return of the restoring bar 21, are engaged in the actuator bars 19.

The actuator bars 19 work in particular in conjunction with the computer unit 24 (FIG. 1) (multiplying and dividing device) and with auxiliary totalizers or storage devices 25, 26. The latter are of no importance for the purpose of the invention. Furthermore, the digit type-carriers 27 which follow the motions of the actuator bars 19, are connected to the aforesaid actuator bars 19.

The computer unit 24 which is in the form of a known rotating actuating device of Odhner wheel or driving pawl type, picks up the value set on the actuator bars 19 during the advance of the restoring bar 21 in the manner that with each rotation of the computer unit 24, the said value is transmitted once to the totalizer wheels 28 of the main totalizer 29 (hereinafter briefly denoted as the totalizer (FIG. 2)).

The totalizer 29 (FIG. 2) is laterally movable with reference to the actuator bars and is moved from order to order to the right or the left by a helically-winding rib or shoulder 30 which coacts with a rack bar 31 in the totalizer 29, at each rotation of a mounted drum 32 carrying the rib 30, which is rigidly connected with the toothed wheel 33.

The machine further has a revolution counter 34 (FIG. 1), the totalizer wheels of which are further rotated in the individual denominations through a number of turns corresponding to the number of rotations of the computer unit 24.

This revolution counter 34 indicates, in the case of multiplication, the multiplier introduced and in the case of division, the quotient obtained. Means (not illustrated) are provided to transfer the multiplier or calculated quotient from the revolution counter 34 to the digit-type carriers 27. The value obtained in the totalizer 29 can also be transmitted through the actuator bars 19 to the digit-type carriers 27.

*Decimal-Point Printing Device*

Figure 4:
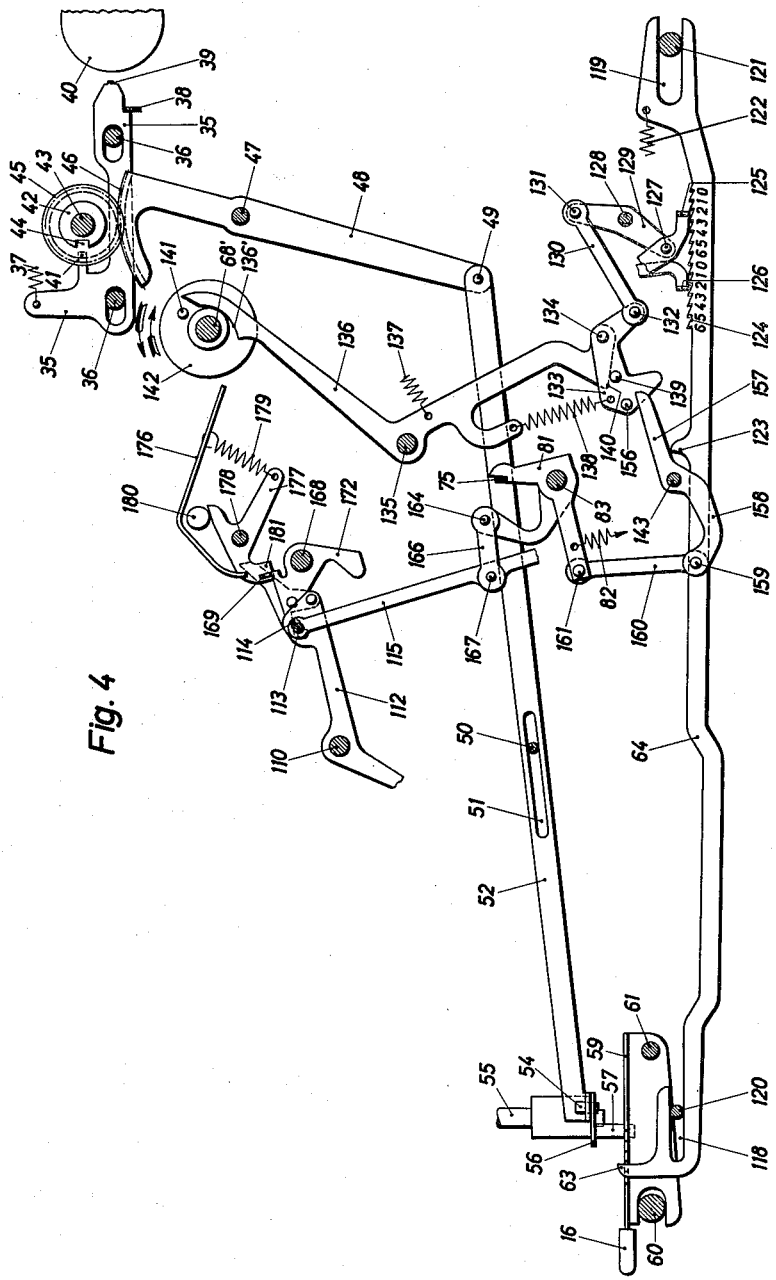
FIG. 4 is a side view of the gearing elements connecting the step control bar with the decimal point printing device and with various other transmissions or gearing elements.

On the left, alongside the first six digit type carriers 27 (FIG. 2) decimal-point type carriers 35 are provided which are movably positioned on fixed rods 36 (FIG. 4) and lie, under the action of springs 37 against a retaining bar 38. The decimal point type carrier 35 selected for printing with its decimal point type 39 will be thrown against a platen 40 by the action of its spring 37 as soon as it is released by the retaining bar 38. Furthermore, the decimal point type carriers 35 are supported by means of tongues 41 by the circumference of a locking cylinder 42 which is rotatably mounted on the shaft 43 and has indentations 44, for instance, blind holes, arranged along a helical line at its periphery, coacting with the tongues 41. By rotating the cylinder 42, the indentations 44 are set in sequence from right to left or from left to right in front of their tongues 41, by which means the locking of the appropriate decimal point type carrier 35 is released for printing, if the retaining rod 38 is moved away. The locking cylinder 42 is rigidly connected to a toothed wheel 45 with which a toothed segment engages which is attached to a lever 48 carried on a fixed pin 47 and to the lower end of which is connected by pin 49 a bar 52 slidably moving on a fixed pin 50 guided in the longitudinal slot 51. In a longitudinal hole 53 (FIG. 2) in a cranked portion on the free end of the rod 52, a bolt 54 of a lever arm 56 carried on a fixed pin 55 engages which engages by means of a sliding pin 57 in an oblique slot 58 of the already mentioned, decimal point setting plate, denoted by 59.

This decimal point setting plate 59 equipped with the already mentioned setting knob 16 is arranged, movable crossways, on axles 60 and 61 (FIG. 3) and the stop faces 62 (FIG. 2) of its steps 0–6 coact with a stop finger 63 of the step-control bar, also already mentioned, denoted by 64, for the calculation of division. This step-control bar 64 controls the lateral shift of the totalizer 29 according to the setting of the decimal point setting plate 59.

If the decimal point setting plate 59 is shifted to the right or to the left by the knob 16 then simultaneously the locking drum 42 is rotated correspondingly by the action of the oblique slot 58 and sets the tongue 41 (FIG. 4) of the decimal point type carrier 35 corresponding to the setting of the decimal point setting plate opposite an indentation 44 so that the said decimal point type carrier 35 makes its impression at the proper time.

*Sequence of Operations During the Introduction of the Dividend Into the Totalizer*

The quotient is formed in the machine in the most usual way in the manner that first the dividend is introduced into the totalizer 29 (FIG. 2) and starting with its highest denomination, the divisor is subtracted as many times as necessary until the capacity of the totalizer 29 has been exceeded, then the divisor is added once, and the totalizer 29 is moved one denomination to the left, and, in this position, the divisor is again subtracted from it as many times as possible until the capacity of the totalizer 29 has been exceeded, the divisor is then again added once and the totalizer 29 is moved a further denomination to the left, and so forth until the totalizer 29 has again reached its home position. The numbers of subtractions in the separate settings of the totalizer give the appropriate digital value of the quotient while the totalizer 29 in its home position either contains the remainder from the division or if the division works out completely, is set at zero.

Apart from the introduction of the dividend into the totalizer 29, these processes are not part of the invention; they are, furthermore, extensively known, and therefore require no more detailed description.

The invention rather relates substantially to the processes which are involved in connection with the introduction of the dividend into the machine, with its transfer into the totalizer 29 and with the shifting of the totalizer 29 according to the number of places fixed for the quotient on the right of the decimal point prior to the introduction of the dividend into the totalizer 29.

To make this more comprehensible, the sequence of these processes will first be generally explained.

At the start of the calculation of a division, in which all the devices of the machine participating in the division are in their starting or zero positions, after keying the dividend on the keys 10, 11 (FIG. 1) and setting the decimal point knob 16 in the decimal point position required for the quotient, the dividend key 14 is pressed. By this means, the shift-driving mechanism for the totalizer 29 is actuated and thereupon, the totalizer 29 with the co-operation of the control bar 64 (FIG. 2) is shifted stepwise to the right until the stop finger 63 of control bar 64 strikes against the set step 62 and is held in place.

The shift driving means, continuing to act, cause an additional or additive shift step of the totalizer 29 to the right, in spite of the retention of the control bar 64 during which the reversing of the motion of the totalizer from right to left occurs. During the following leftward step of the totalizer 29 which again cancels the additional rightward step of the totalizer 29, the advance of the restoring bar 21 is prepared, on termination of the leftward step, the forward motion of the restoring bar 21 follows, by means of which the actuating rods 19 are brought forward to the set pins 23 of the set-pin carriage 17 moved during the keying of the dividend and are set for the dividend, and during which they simultaneously feed the dividend into the setting elements of the computer unit 24. While the restoring bar 21 still remains in its forward position 21', the driving mechanism of the computer unit 24 is put into action and causes it to perform a rotation, during which the dividend introduced therein is transferred to the totalizer 29 which is in a position moved to the right, with reference to its home position corresponding to the set number of denominations to the right of the decimal point. There subsequently follows, through the actuator bars 19, the printing of the dividend in the printing mechanism, with the decimal point in the position corresponding to the setting of the setting plate 59.

By the subsequent return of the restoring bar 21 following on the rotation of the computer unit 24, the cancelling of the dividend in the computer unit 24 is obtained. Thus the introduction of the dividend into the totalizer 29 is completed.

Now, in a known manner, after keying the divisor by means of the keys 10, 11, the divisor key 15 is pressed (FIG. 1), whereupon the usual processes explained above follow, viz. the subtractive and additive transfer of the divisor into the totalizer 29 previously moved into its extreme position on the right, with simultaneous shifting of the totalizer 29 to the left until it is again restored to its home position (FIG. 1). The divisor is then printed with the decimal point in the set position. The quotient appears in the revolution counter 34 and also is printed with its decimal point, while the content of the totalizer 29, which is either zero or the remainder from the division is likewise printed. All these processes occur in a known manner entirely automatically without additional settings, so that, for performing the whole calculation of the division together with the printing of the decimal point, only the setting of the decimal point setting element 16, the keying of the dividend and the divisor and the pressing of the dividend key 14 and the divisor key 15 are necessary. Since these processes following on the introduction of the dividend into the totalizer 29 form no part of the invention, they will not be discussed in detail in the following.

Drive Clutches

Figure 10:
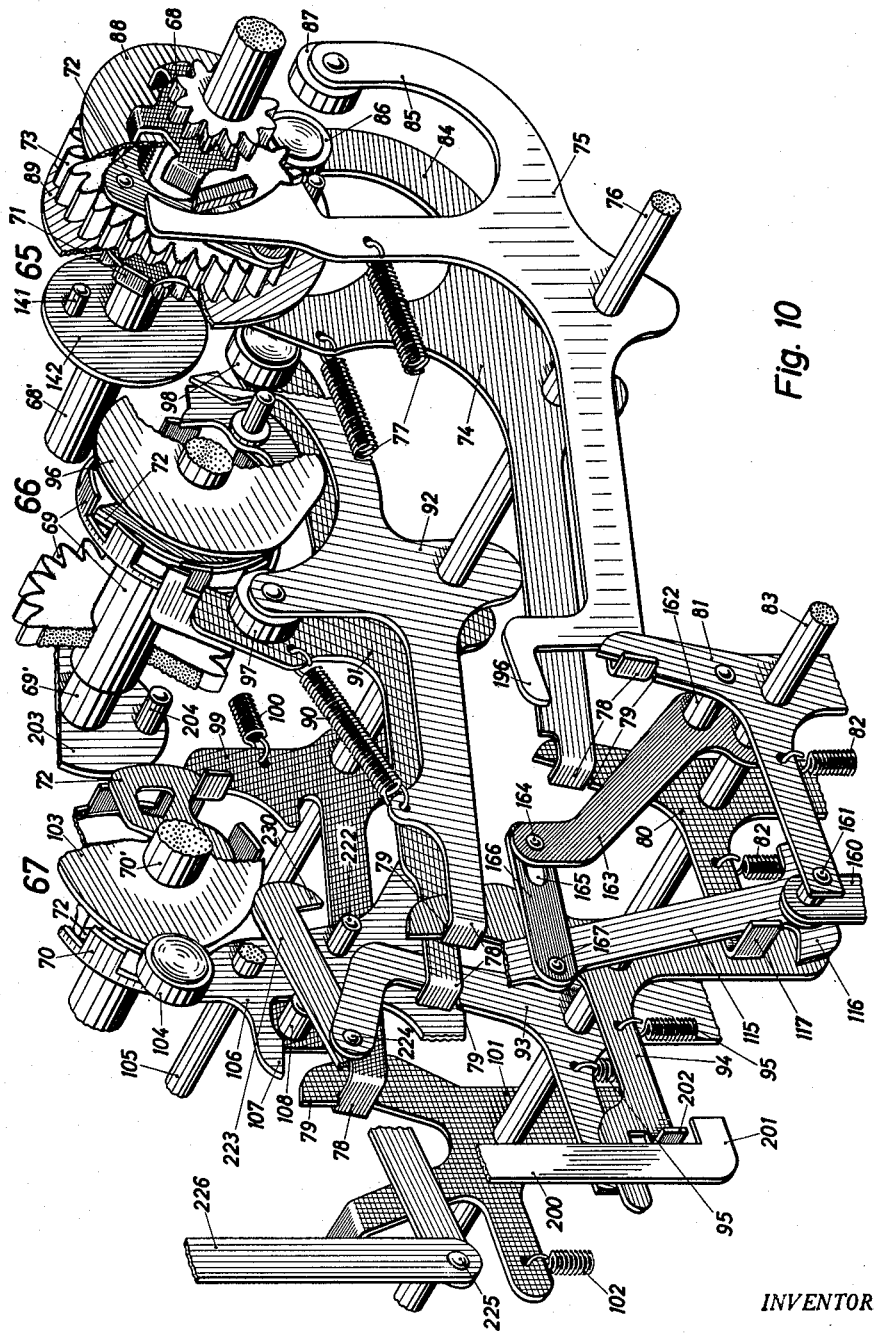
FIG. 10 is a perspective view of the drive clutches used, with the associated gearing parts.

The connecting and disconnecting of the driving mechanism for moving the totalizer 29 to the left or to the right, of the restoring bar 21 for the forward and backward motions and for rotating the computer unit 24 is by means of couplings of known construction which can be seen from FIG. 10 and are substantially similar to the clutches or couplings described in DAS 1,084,058 (U.S. patent application 809,141) and in the present case the "totalizer shifting" clutch is denoted by 65, the "restoring bar clutch" by 66 and the "computer unit" clutch by 67. The driving parts 68, 69, 70, 71 of the clutches can be coupled with the driven parts 68', 69', 70', by in each case at least one coupling pawl 72 pivotably arranged on the driven parts. Under the pull of a spring, each coupling pawl tends to move into its coupling position, in which it connects the driving and the driven parts together, to rotate jointly.

A spring-controlled stop lever, located outside the clutch coacts with each coupling pawl and normally holds the coupling pawl in the disconnected position and the driven coupling part in the resting position. In this case, the stop lever is locked by a locking lever. The connecting of a clutch is obtained by disconnecting its locking lever from the stop lever.

The "totalizer shift" clutch 65 (FIG. 10) has two oppositely-acting similar drives 68 and 71 which are rotated to the left or right of the driven parts 68', 72, 142, 73, 88, 89 of the clutch 65 either by means of the coupling pawl 72 or a similar coupling pawl (not illustrated), on the rear side of the toothed wheel 73. The toothed wheel 73 of the clutch 65 is connected to the toothed wheel 33 of the helically-winding rib 30 (FIG. 2) which according to the direction of the rotation of the toothed wheel 73 shifts the totalizer 29 to the left or to the right, and, in particular, by one denominational space during each rotation of the clutch 65. The stop lever 74 is intended for rotation of the driven parts of the clutch 65 in the counterclockwise direction (shift of totalizer to the right) while the stop lever 75 is intended for rotation in the clockwise direction (shift of totalizer to the left). The stop levers 74, 75 are carried by the rod 76 and are under the influence of the pull of springs 77. In the stop position, the stop levers 74 and 75 lie with bent over ears 78 against locking stops 79 on their locking levers 80 and 81 which are influenced in a counterclockwise direction by springs 82 and are carried on a fixed rod 83. If one of these locking levers 80 and 81 is rotated by a gear element in the clockwise direction, then the associated stop lever 74 or 75 can rotate in a counter-clockwise direction, by which means the toothed wheel 73, permanently connected with the driven shaft 68', is coupled for the shift of the totalizer to the right or to the left. The cooperation of the locking levers 80, 81 with the associated gear elements is further described below.

The rearward facing arms 84 and 85 of the stop levers 74 and 75 carry rolls 86 and 87 which coact with cam discs 88 which are permanently connected to the driven shaft 68' by which means, on conclusion of the rotation, the stop levers 74 and 75 are pushed back into the stop position.

The "restoring bar" clutch 66 is similarly associated with two stop levers 91 and 92, carried on the rod 76, subjected to the influence of the spring 90, the stop lever 92 for the forward motion (rotation of the shaft 69' from 0 to 180°) and the stop lever 91 for the backward motion of the restoring bar 21 (rotation of the shaft 69' from 180 to 360°). They also coact with locking levers 93 and 94 carried on the bar 83, which are influenced by springs 95. On the driven shaft 69' of the clutch 66, a cam 96 is attached which at a given time point acts on the rolls 97 and 98 of the stop levers 91 and 92, to return these to the stop position.

Finally the "computer unit" clutch 67 coacts with a stop lever 99 under the action of the spring 100 which by means of its bent ear 78 is locked in the stop position by a locking lever 101 carried on the rod 83 which is influenced by the spring 102. This clutch has a cam 103 which coacts with a counter-roller 104 which is seated on a rocking lever 106 carried on a rod 105 which at a given instant moves the stop lever 99 back into its stop position through the arm 107 of the lever 106 and the bolt 108 of the stop lever 99.

Shifting the Totalizer to the Right

In order to connect the "totalizer shift" clutch 65 so that through its driven element it shifts the totalizer 29 to the right, on depression of the dividend key 14 by means of a projection 108 (FIG. 3) and of a pin 109 a key lever 112 loosely carried on a rod 110, influenced by a spring 111 is tilted in a counter-clockwise direction and thereby raises a draw bar 115 engaging with a horizontal rod 113 in a longitudinal hole 114 in the key lever 112 which acts by means of a nose 116 at the lower end on a bent over ear 117 of the locking lever 80 (FIG. 10) carried on the bar 83 of the "totalizer shift" clutch 65 so that this releases its stop lever 74 and the coupling shaft 68' (FIG. 10) and the rib 30 (FIG. 2) is rotated in the sense of a shift of the totalizer 29 to the right through one denominational space.

The step control of the shift of the totalizer 29 to the right is performed by the step control bar 64 coacting with the decimal point setting plate 59 (FIG. 3) which is mounted movably by means of open slits 118 and 119 on fixed rods 120 and 121 and is drawn against a stop 143 by a spring 122 with a nose 123. It has a ratchet gear 124 which coacts with an actuating pawl 125 and a back locking pawl 126.

The actuating pawl 125 is rotatable on a pin 127 on a double lever 129 swinging about a fixed pin 128, the upper end of which is connected by a link 130 through the pins 131 and 132 to an intermediate piece 133 which is arranged rotatably about a pin 134 on an actuating lever 136 swinging about an axis 135 which is influenced counter-clockwise by a spring 137. By a spring 138 connected to the actuating lever 136 the intermediate piece 133 with a stop pin 139 fitted thereon, is drawn against a lower edge 140 of the lever 136.

Figure 2:
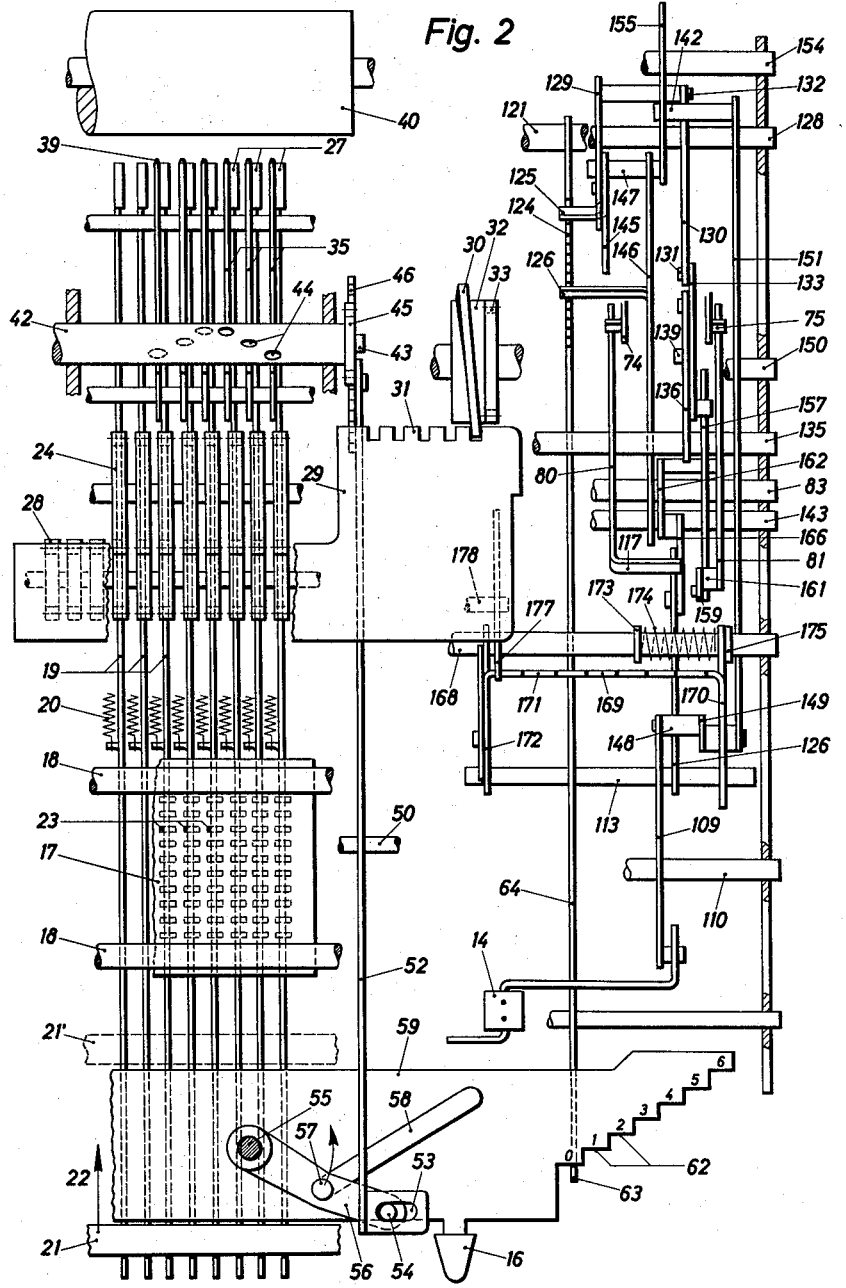
FIG. 2 is a plan view of the devices participating in the stepwise motion of the totalizer and in the setting of the decimal point printing device.

The upper arm of the actuating lever 136 coacts by a thrust face 136' with the side pin 141 on a disc 142 which is attached on the driven shaft 68' (FIG. 10) of the "totalizer shift" clutch 65. After this shaft 68' has been set in rotation as a result of pressing the dividend key 14, as described, the pin 141 (FIG. 3) by the thrust face 136' imparts to the lever 136 on each revolution of the shaft 68' a thrust in the clockwise direction, by which means the link 130 imparts to the double lever 129 and the pin 127 of the actuating pawl 125 an impulse to the right, and on engagement of the actuating pawl 125 with the teeth 124, the control rod 64 is moved to the right by one tooth space. Thereupon the back-locking pawl 126 rotatably carried on a fixed rod 143 and influenced by a spring 144 drops behind the next tooth of the rack 124 and holds the control rod 64 in the position reached. With each subsequent rotation of the clutch shaft 68', the step-control bar 64 is moved in each case one more step to the right, whereby simultaneously the totalizer 29 is also moved through the helically-winding rib 30 (FIG. 2) in each case one denominational space to the right (FIG. 2).

If the setting plate 59 has been set at "3", corresponding to three places to the right of the decimal point, then the finger 63 of the step control bar 64, on completion of the third step, lies against the stop face 62 (FIG. 2) of the step "3" so that during the following rotation of the clutch shaft 68' which continues running unchanged, the step control bar 64 is held in position by the step "3." On the next impact of the actuating lever 136 caused by the pin 141 (FIG. 3) in spite of the retention of the pin 131 (FIG. 3) by the link 130, the deflected motion of the lever 136 is made possible in that the intermediate piece 133, surmounting the force of the spring 138 swings in the counter-clockwise direction about the pin 134, by which means the stop pin 139 is lifted from the edge 140 but after the pin 141 has moved forward to the push face 136', it at once returns to its position at the edge 140.

The possibility for deflection of the lever 136 by overcoming the positive force linkage between the two elements 136 and 133 with cooperation of the spring 138 enables the shaft 68' to be prevented from being held firm against rotation, so that the totalizer 29 makes a further, additional step to the right, through one denominational space although the step-control bar 64 does not perform an additional step.

*Disconnecting the Rightward Step Control*

In order to disable the actuating pawl 125 (FIG. 3) and the back-locking pawl 126 during the totalizer shifts which do not belong to the process of feeding the dividend into the totalizer 29, the actuating pawl 125 and the back-locking pawl 126 are provided at the top with projecting arms 145, 146, the lower edges of which coact with a pin 147, by which the two pawls are raised from the teeth 124 while the dividend key 14 is in the undepressed state.

A connecting rod 149 is attached to the key lever 112 by pin 148 and is connected at its lower end with a lever 151 carried on a fixed pin 150, which engages at its lower end with a pin 152 in a longitudinal hole 153 of a lever arm 155 loosely carried on a fixed bar 154, which, at its free end carries the aforesaid pin 147.

Figure 3:
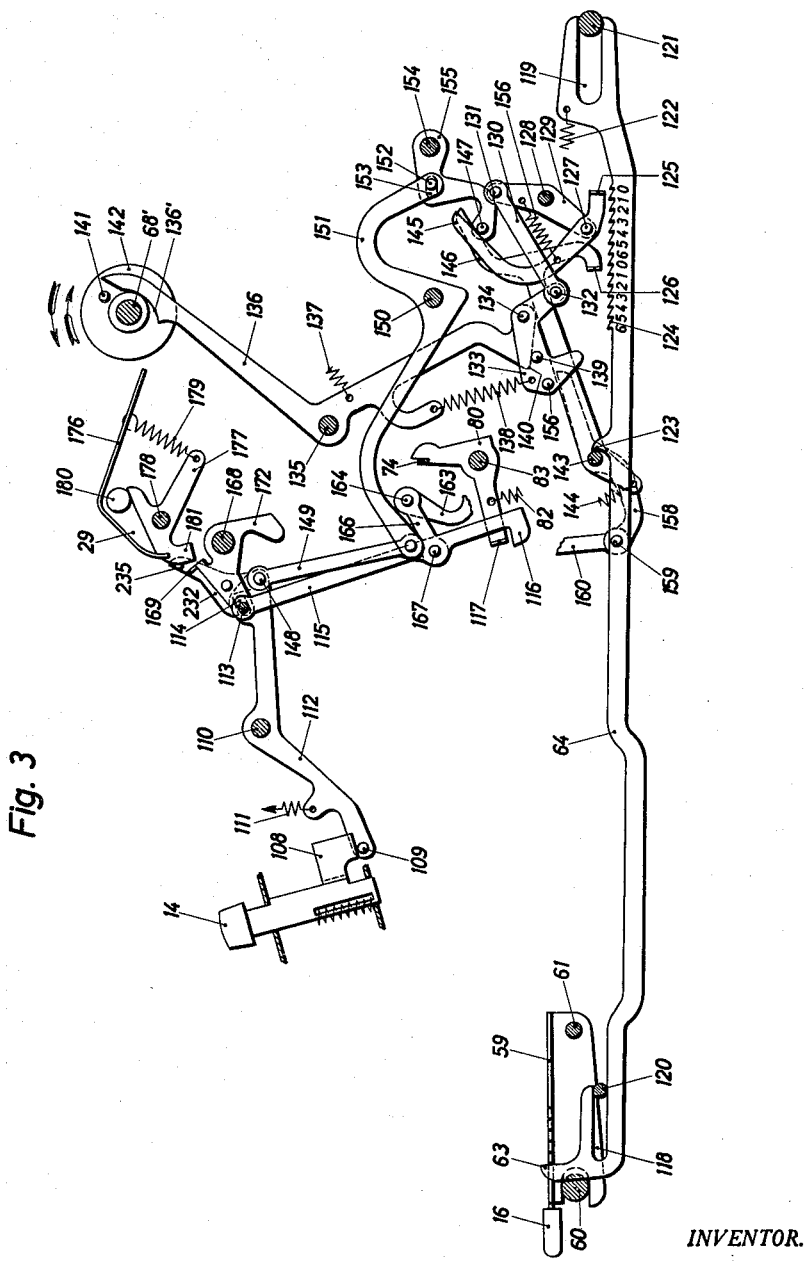
FIG. 3 is a side view of the gearing elements connecting the dividend key with the totalizer and the step control bar.

As long as the dividend key 14 remains in the undepressed position shown in FIG. 3, as can be seen, the two pawls 125, 126 are withdrawn from the teeth. If the dividend key 14 is pressed, the pin 147 releases the two pawls, so that the pawl 125 under the action of a spring 156 connected to the lever 129 and the pawl 126 under the action of a spring 144 can enter into the teeth 124. If the dividend key 14, which is held in the depressed position by a locking device of known kind which is therefore not further described, is released after transfer of the dividend to the totalizer 29, then the two pawls 125, 126 are again withdrawn from the teeth 124 by the pin 147, whereupon the step-control bar 64 returns into its resting position under the action of its spring 122, in which its nose 123 lies against the bar 143.

*Controls Actuated by the Additional Step to the Right*

The deflection of the intermediate piece 133 (FIG. 3) which occurs during the additional step to the right of the totalizer 29, by overcoming the resistance of the positive force linkage 136, 139, 140, 133, 138 (FIG. 4) is intended as a preliminary to the reversing of the totalizer shift clutch from rightward to leftward advance of the totalizer 29.

By the swinging of the intermediate piece 133 counter-clockwise about the pin 134 (FIG. 4) a pin 156 seated on the distance piece 133 acts on the right arm 157 of a lever 158 loosely carried on the rod 143 and deflects this in a clockwise direction. The other arm of the lever 158 is connected by a pin 159 and an upwardly inclined rod 160 also a further pin 161 with the locking lever 81 (FIG. 4), carried on the rod 83 of the "totalizer left shift" clutch (FIG. 10) so that by the tilting of the intermediate piece 133, the stop lever 75 by the action of locking lever 81 is released and thus the reversal of the direction of the shaft 68' is initiated. At the same time, a lever arm 163 (FIG. 10) loosely carried on the rod 83, joined by a pin 162 to the locking lever 81, the pin of which 164 passes through a longitudinal hole 165 in a link 166 which is connected to the rod 115 by a pin 167, tilts the rod 115 to the right, so that the locking lever 80 is released for the relocking of its stop lever 74. This locking is completed when the cam shaft 89 (FIG 10) on conclusion of the additional step motion deflects the stop lever 74 in a clockwise direction. Since the stop lever 75, as described above, has been simultaneously released from its locking lever 81, the component of the clutch 65 causing the leftward shift of the totalizer 29 is now engaged and the direction of rotation of the shaft 68' is now reversed in the sense of a leftward shift of the totalizer 29.

*Performing a Leftward Step*

During the leftward step of the totalizer 29 the initiation of the forward motion of the restoring bar from position 21 to position 21' and the transfer of the dividend introduced by means of the keys 10, 11 into the set-pin carriage 17 (FIG. 2) to the setting elements of the computer unit 24, associated therewith, is prepared.

In association with the forward motion of the restoring bar from position 21 to position 21', the dividend is transferred into the totalizer 29 by a single rotation of the computer unit 24. The associated clutches are connected or disconnected.

The fixed rod 168 (FIG. 2) carries rotatably and movably, a bow 171 formed of the ratchet gear bar 169 and two arms 170, 172. By means of its arms 170, 172, it carries the horizontal bar 113 (cf. FIG. 3) which passes through the long slotted hole 114 of the key lever 112. Between the arm 170 (FIG. 2) and a ring 173 attached on the rod 168, a compression spring 174 is fitted, which is intended to press the bow 171 against another ring 175 fastened on the rod 168.

As can be seen from FIG. 3, the teeth 169 are in the represented resting position of the bow 171, near but outside the casing 176 of the totalizer 29. The teeth 169 coact with a locking pawl 177 which is pivotally carried by means of a pin 178 in the right hand side wall of the totalizer casing 176 and is usually drawn by the action of a spring 179 against a fixed stop 180 in the totalizer casing 176. When the bow 171 (FIG. 2) is in its resting position, the teeth 169 are out of engagement with an actuating lug 181 of the pawl 177. The initial depressing of the dividend key 14, causes the bow 171 to swing clockwise by the action of the key lever 112 and the rod 113, by which means the teeth 169 are brought into engagement with the actuating lug 181.

During the stepwise shift of the totalizer 29 to the right, the locking pawl 177, which, in the resting position of the totalizer 29 takes up the position shown in FIG. 2, on depression of the dividend key 14 and by a clockwise swing of the bow 171, is caused to slide over the teeth in the rack bar 169 and catches in behind each tooth.

Upon initiation of the movement to the left of the totalizer 29 by one step, by means of the locking pawl 177 engaging in the teeth 169, the bow 171 overcoming the force of the spring 174 by virtue of the mobility of the bow on the fixed rod 168, is carried one step to the left, by which means the bow arm 172 reaches the position shown in broken lines in FIG. 7. Thereupon the bow arm 172 (FIG. 7) swings in a counterclock wise direction an angled lever 183 carried on a fixed rod 182, which lever lies under the influence of a spring 184, with its upper arm 185 against the bow arm 172 of the bow 171.

The following arrangement is provided to disconnect the "totalizer shift" clutch 65 at the end of the step to the left. The lever arm 186 (FIG. 7) raised by the leftward shift of the totalizer 29, acts on a pin 187 on a slider 190 carried on a cam lever 189 working on a fixed pivot 188 (FIG. 8); in the cam way 191 whereof the roller 192 of a lever 194 pivoting on a fixed pin 193 works. The lever 194 coacts through a nose 195 with a finger 196 (FIGS. 8 and 10) of the holding lever 75 of the "totalizer shift" clutch 65 and lifts this into its locking position so that the "totalizer shift" clutch 65 is disconnected after one rotation and only accomplishes one step to the left of the totalizer 29.

The lower, horizontal arm 186 (FIG. 7) of the angled lever 183 acts on an edge 197 of the lever arm 198, which is rotatably carried on a rod 110 (FIG. 5) and raises the latter, by which means a perpendicular connecting rod 200 influenced by a spring 199 connected to the lever arm 198 is moved upwards. With its nose 201 at the lower end, the rod 200 engage under a bent ear 202 of the locking lever 94 (FIG. 10) for the "restoring bar" clutch 66 (FIG. 10) and tilts this in a clockwise direction so that the said clutch is engaged and the forward motion of the restoring bar 21 (FIG. 2) into position 21' follows, by which means the shaft 69' (FIG. 10) performs a half rotation (0–180°).

During this forward motion of the restoring bar, the toothed actuator rods 19 (FIG. 2) are released from the restoring bar 21, so that under the pull of their springs 20 they strike against the set pins 23 keyed by the keys 10, 11 and are set for the dividend. Since the setting elements of the computer unit 24 simultaneously engage with the actuator rods 19, they are likewise set for the dividend. The setting of the digit-type carriers 27 is performed in a similar manner. To transfer the dividend from the computer unit 24 to the totalizer 29, the computer unit 24 must be caused to rotate once, by which means at the same time the return motion of the restoring bar 21 is initiated.

For the drive of the computer unit 24, a cam plate 203 is attached on the shaft 69' (FIG. 10) of the "restoring bar" clutch 66 which is provided with a pin 204 coacting with the thrusting edge 205 (FIG. 9) of a lever 208 influenced by a spring 207 carried on the rod 206 which acts by a pin 209 on a lever mechanism to connect the computer unit 24. This consists of a lever 212, carried on a fixed rod 110 (FIG. 9) swung against the action of a spring 210 by an actuator lug 211 of the dividend key 14 in a counterclockwise direction, which is connected by a rod 213 hinged on the said lever by a pin 214 and at the other end by a pin 215 to a bumper rail 217 carried on a rod 216 flexibly suspended at the upper end. This coacts with its forked end 219 influenced by a spring 218 with the said pin 209 and has an actuator lug 220 which on depression of the dividend key 14 is raised in front of a bent ear 221 of the already mentioned locking lever 101 for the "computer unit" clutch 67.

If during the forward motion of the restoring bar, the pin 209 (FIG. 9) acts on the end of the bumper rod 217, the locking lever 101 is tilted in the clockwise direction, during which its locking lug 79 releases the bent ear 78 of the holding lever 99 of the "computer unit" clutch 67, so that in conjunction with the forward motion of the restoring bar, this performs a rotation and by this means the dividend held in the computer unit 24 is fed into the totalizer 29.

At the same time, the return motion of the restoring bar 21 from position 21' (FIG. 2) into position 21 is prepared, viz. by means of the already previously mentioned lever 106 (FIG. 10) which obtains a push in the counter-clockwise direction from the cam disc 103 of the clutch "computer unit" 67 shortly before the termination of its rotation.

The lever 106 carries a pin 222 (FIG. 10) which coacts with a pawl 223, connected on the one hand by a pin 224 to the locking lever 93 for the "restoring bar" clutch 66 and further, by a pin 225 to an upright connecting rod 226 (FIGS. 9 and 10). The latter is connected to a key lever 228 under the action of the spring 227, carried on the bearing rod 110, which coacts with a projecting shank 229 on the dividend key 14.

By the depression of the dividend key 14, the pawl 223 with its nose 230 is tilted behind the pin 222 (FIG. 10) so that on striking the lever 106 after connecting the "multiplying and dividing unit" clutch 67, the pawl 223 is carried to the right and imparts to the locking lever 93 a rotation in a clockwise direction, by which means the holding lever 91 of the "restoring bar" clutch 66 is released and this clutch is connected for the second half of the rotation of the shaft 69'. Simultaneously, during the swinging motion of the lever 106 in a counter-clockwise direction, the holding lever 99 of the "computer unit" clutch 67 is returned by the lug 107 and the bolt 108 into its holding position so that the "computer unit" clutch 67 is returned by the lug 107 and the bolt 108 into its holding position so that the "computer unit" clutch 67 is held at the end of its rotation.

At the end of the backward motion of the restoring bar follows the disconnecting of the "restoring bar" clutch 66 by the return of the holding lever 91 by means of the cam disc 96 and the roller 98.

Locking the Dividend Key

The dividend key 14 is locked in the depressed position by a known locking device which is not, therefore, further described, and after the dividend has been introduced into the totalizer 29 is released by the restoring bar 21 on return of the latter to its home position, so that the dividend key 14 again returns into the starting position shown in FIG. 3.

At the same time, the components and devices moved by the dividend key and held by it in the position to which they have been moved, also return to their resting position.

This applies in the case of the rod 115 (FIG. 3) which effects the engagement of the "totalizer shift clutch" 65, also in the case of the connecting rod 149 which, through the levers 151 and 155 and the pin 147 raises the pawls 125 and 126 from the teeth 124, but particularly in regard to the bow 171 (FIG. 3) which, by the release of the dividend key 14 is swung back in a counter-clockwise direction, so that the teeth 169 are released from the locking pawl 177 and the bow 171 automatically returns to its starting position.

As already described and assumed as known, it is necessary, starting from the home position of the totalizer 29, to move this to the right, prior to the introduction of the dividend, by the same number of places as the number of denominations desired on the right, behind the decimal point. Since the present totalizer shift device is intended to shift the totalizer 29 to the right by a number of places corresponding to the desired number of denominations behind the decimal point, it is necessary that the totalizer before the transfer of the dividend, or before the release of the dividend key 14, is in its home position, in which its outermost right hand side totalizer wheel 28 is lying in the plane of the outermost right hand side actuator rod 19, so that the forming of the value in the revolution counter 34 with the decimal point in the correct position follows. It must therefore be ensured that the dividend key 14 is only actuated if the totalizer 29 is in the home position. In all other positions of the totalizer 29, the dividend key 14 is locked in its resting position. This is effected by a locking pawl 232 carried on the bow 171 (FIG. 5) by a pin 231 which, under the action of its spring 233 lies against the rod 113 of the bow 171 and which in the resting position of the bow 171 and the dividend key 14 lies with its nose 235 (FIGS. 3 and 5) outside the casing 176 of the totalizer 29.

In the home position of the totalizer 29 the locking pawl 232 (FIG. 6) lies opposite a notch 236 in the totalizer casing 176, so that during the swinging of the bow 171 caused by depression of the dividend key 14, it can pass through the notch 236. During the subsequent lateral shift of the totalizer 29, the continuous edge 237 of the totalizer casing 176 slides over the nose 235 and when on release of the dividend key 14, the bow 171 (FIG. 5) swings back in a counter-clockwise direction, the nose 235 is deflected against the action of the spring 233 and on leaving the edge 237 lies in front of the edge 237 so that after the ensuing transfer of the dividend, the dividend key 14 is locked. It remains locked continuously until on termination of the computation of the division, the totalizer 29 returns to its home position, or until, if necessary, the dividend is obtained by actuating the summation key 13 in the totalizer 29, whereby also the totalizer 29 is returned to its home position.

Example of a Division

We assume that the division $$80.11 \div 14.2 = 5.641 \text{ remainder } 0.0078$$

is to be performed, the quotient to be calculated up to three places on the right of the decimal point.

For this purpose, first the setting knob 16 (FIG. 1) is set on the number 3, the dividend 80.110 keyed on the keys 10, 11 by which means the set pins 23 of the set-pin carriage 17 are set for the dividend. Then the dividend key 14 is pressed, by which means the totalizer shift clutch 65 is connected and the totalizer is moved with the help of the step control bar 64 step-wise through 3 denominational spaces to the right. At the end of the third step, the step control bar 64 is locked by the appropriate step 62 (FIG. 2). The continuing drive of the shaft 68' (FIG. 3) produces a fourth, additional shift of the totalizer 29 through one place to the right, by a further striking of the lever 136 in a clockwise direction, by which means, with the pin 131 fixed in position, the intermediate piece 133 performs a deflection about its pivot pin 134, the pin 156 of the intermediate piece 133 acts on the lever 158 and by this means, after completing an additional step of the totalizer 29 by means of the locking lever 81 (FIG. 4), the "totalizer shift" clutch 65 is reversed from rightward shift of the totalizer 29 to leftward shift.

In the ensuing leftward shift of the totalizer 29 which cancels the additional fourth step to the right, the "restoring bar advance" clutch is engaged, which acts when the leftward shift is completed, so that the actuating bars 19 and simultaneously the setting elements of the computer unit in 24 are set to the dividend held in the set-pin carriage 17. Thereupon the "computer unit" clutch 67 is engaged by which means the dividend, by a rotation of the computer unit 24 is transferred to the totalizer 29, shifted to the right by three denominational places from its home position. Thereupon the "restoring bar backward motion" clutch is connected, the dividend is printed and finally the dividend key 14 is restored when the restoring bar 21 reaches its starting position.

At the end of this operation, the dividend 80.110 is in the totalizer 29 while the other parts of the machine have resumed their starting position.

Now follows, in known manner, the setting of the divisor 14.200 by the keys 10, 11 and the depression of the divisor key 15 (FIG. 1) by which means the divisor in the manner explained above in regard to the dividend, beginning with the highest denomination of the same, is deducted and the individual digits of the quotient, appear in the totalizer.

The printing of the dividend 80.110 in the printing unit occurs as already described, after its transfer into the totalizer 29. The printing of the divisor 14.200 follows on termination of the computation of the division whereupon the remainder of 0.0078 left in the totalizer 29, since the totalizer 29 in the meantime has returned to its home position, displaced by three denominations, is printed as 7.800. Finally, the quotient 5.641 is printed. The processes described above follow automatically in the above sequence.

If the setting knob 16 is set to zero then, since the finger 63 is lying directly alongside its stop face 62, no regular shifting of the totalizer 29 to the right occurs, except, however, the above described "additive" or additional step to the right, which brings about the leftward step of the totalizer 29 which is required for the necessary actions to introduce the dividend into the totalizer 29. No printing of the decimal point occurs in this case, since no decimal point carrier 39 is provided to the right of the outermost right hand side digit type carrier 27.

What I claim is:

1. In a calculating machine for division calculations, a totalizer including a plurality of ordinally arranged numeral wheels, a digit setting mechanism for setting the dividend and the divisor, a printing mechanism comprising digit type carriers and decimal point type carriers, an actuating mechanism comprising denominationally arranged and longitudinally movable actuating rack bars attached to said digit type carriers, means for transmitting the dividend or divisor set up in said setting mechanism to said actuating rack bars and said type carriers, means for transmitting the dividend and divisor into said totalizer, a revolution counter for receiving the quotient by counting the number of machine operations in each shifting position of the totalizer and being engageable with said actuating rack bars, a shift unit for denominationally shifting the totalizer to the right or to the left, respectively, comprising a clutch for shifting the totalizer to the left, and a second clutch for shifting the totalizer to the right, a setting means for pre-determining the ordinal position of the decimal point in the quotient to be calculated for controlling the number of shift steps of the totalizer to the right, according to the adjustment of the setting means for the decimal point, and means for forming and automatically locating the quotient in the revolution counter in an ordinal position corresponding to the adjustment of said setting means for pre-determining the decimal point.

2. In a calculating machine according to claim 1, said decimal point setting means comprising a movable stepped decimal point setting plate, a step control bar having a lug cooperating with the preset step of said setting plate, means for moving said lug of said control bar onto said preset step at each denomination movement of the totalizer by one step to the right, and means for disconnect shifting of said totalizer to the right as a result of stopping of said lug by said preset step.

3. In a calculating machine according to claim 1, said decimal point setting means comprising a movable stepped decimal point setting plate, a step control bar having a lug cooperating with the preset step of said setting plate, means for moving said control bar with its lug onto said preset step at each step movement of the totalizer by one step to the right, and means for initiating automatically one further step movement of the totalizer to the right subsequent to said stopping of said step control bar, means for automatically causing a shift step of the totalizer to the left on termination of said one further step movement, and means for preparing transmitting of the set dividend into the totalizer through said shift step to the left.

4. In a calculating machine according to claim 1, said decimal point setting means comprising a movable stepped decimal point setting plate, a step control bar having a lug cooperating with the preset step of said setting plate, means for moving said control bar with its lug by one step onto said preset step at each step movement of the totalizer to the right, and means for initiating one further step shift of the totalizer to the right, comprising a force connection between two associated members of said means for stepwise moving said control bar, one of the two members being adapted to be stopped on overcoming said force connection by the drive of the one further step movement, the other one being moved, means for reversing the direction of shift of the totalizer, and connecting means between said moved associated member and said reversing means, whereby shifting of the totalizer will be reversed for the shift step subsequent to the one further step movement of the totalizer to the right.

5. In an apparatus according to claim 1, and means for selecting the decimal point carriers for printing, said decimal point setting means comprising a movable stepped setting plate, positive connections between said selecting means and said setting plate, whereby on each setting of said setting plate one of the decimal point carriers will be made effective which corresponds to the preset step of said setting plate.

6. In an apparatus according to claim 1, and means for selecting the decimal point carriers for printing, said decimal point setting means comprising a movable stepped setting plate, said setting plate having an oblique slot, a movable locking cylinder having indentations in denominationally spaced order cooperating each with a tongue of its associated decimal point type carrier, a connection means engaging said oblique slot and being attached to said locking organ, whereby on each setting of said setting plate, said locking organ will be placed with an indentation opposite a tongue which corresponds to a decimal point type carrier corresponding to said preset step.

7. In a calculating machine according to claim 1, a restoring bar for restoring said actuating rack bars, a "restoring bar-return movement"—clutch, a computer unit for dividing operations, a "computer unit" clutch for rotating said computer unit, means for engaging said "computer unit"—clutch during the forward movement of the restoring bar, and means for preparing the engagement of said clutch for the return of the restoring bar during the rotation of the computer unit.

8. In a calculating machine according to claim 1, said decimal point setting means comprising a movable stepped decimal setting plate, a step spring influenced control bar having a lug cooperating with the preset step of said setting plate, means for moving said control bar with its lug by one step onto to said preset step at each step movement of the totalizer to the right, a ratchet gear on said control bar, an actuating pawl and a back locking pawl cooperating therewith, a dividend key for conditioning and releasing the machine for dividing operations, means for holding it depressed during each dividing opeartion, connection means between said dividend key and said actuating pawl and back locking pawl for holding them in engagement with said ratchet gear as long as said dividend key is depressed and for disengaging them when the dividend key is released.

9. In a calculating machine according to claim 1, a restoring bar having an oscillating movement, a dividend key for conditioning and releasing the machine for dividing operation, means for holding depressed said dividend key during each dividing operation, means for releasing all setting means acted upon on a dividing operation by the return movement of said restoring bar.

10. In a calculating machine according to claim 1, a dividend key for conditioning and releasing the machine for dividing operations, a locking pawl rockably mounted on the frame of the machine and cooperating with an edge of the totalizer case, a cut out in said edge enabling said locking pawl to be passed therethrough when the totalizer is in its home position and to glide below said edge on the moving of the totalizer to the right, positive connection means between said dividend key and said locking pawl adapted to move said locking pawl again before said edge when the totalizer key is being released, whereby the released dividend key is prevented to be depressed again before the totalizer has reached again its home position.

11. In a calculating machine according to claim 1, said decimal point setting means comprising a movable stepped decimal point setting plate, a step control bar having a lug cooperating with the preset step of said setting plate, means for moving said lug of said control bar by one step onto said preset step at each step movement of the totalizer to the right, and means for initiating a single further step shift of the totalizer to the right, comprising a force connection between two associated members of said means for stepwise moving said control bar, one of the two members being adapted to be stopped on overcoming said force connection by the drive of the one further step shift, the other one being moved, engaging and disengaging means for the clutches of said shift unit, connection means between said moved associated part and said engaging and disengaging means so constructed that on overcoming said force connection said clutch for shifting the totalizer to the left will be disengaged during the running cycle of operation and said clutch for shifting the totalizer to the left will be prepared to be engaged on the subsequent cycle of operation.

12. In a calculating machine according to claim 1, and a dividend key for conditioning and releasing the machine for transmitting the set dividend to the totalizer, a rockable ratchet gear bar mounted in the mahcine frame, a locking lever cooperating therewith and mounted on the totalizer, means for rocking said ratchet gear bar into engagement with said locking lever actuated by said dividend key, said ratchet gear bar being axially movable to the left against spring action, the teeth of said ratchet gear being formed so as permitting the carry along said ratchet bar on moving the totalizer to the left, a restoring bar for restoring said actuator bars, engaging and disengaging means for the clutches of said totalizer shift-unit, connections between said ratchet gear bar and the means for disengaging said clutch for shifting the totalizer to the left and for preparing engagement of the clutch for returning the restoring bar, so constructed that on the termination of the shift step to the left of the totalizer same will be arrested, and the dividend will be transmitted to the totalizer in an ordinal position, corresponding to the predetermined setting of the decimal point.

References Cited in the file of this patent

UNITED STATES PATENTS

| | | |
|---|---|---|
| 2,773,646 | Mathi | Dec. 11, 1956 |
| 2,917,232 | Wagemann | Dec. 15, 1959 |
| 3,057,549 | Wagemann | Oct. 9, 1962 |
| 3,079,073 | Heinze et al. | Feb. 26, 1963 |